United States Patent [19]
Alley

[11] 3,899,632
[45] Aug. 12, 1975

[54] RETROFIT EMERGENCY LIGHTING PACKAGE

[75] Inventor: Robert P. Alley, Danville, Ill.

[73] Assignee: Construction Materials Division General Electric Company, Indianapolis, Ind.

[22] Filed: Oct. 23, 1973

[21] Appl. No.: 408,661

[52] U.S. Cl............ 174/52 R; 174/DIG. 2; 307/66; 317/99
[51] Int. Cl.² ......................................... H05K 5/04
[58] Field of Search............... 174/DIG. 2, 52 R, 50; 307/23;26;64;66;317/99; 315/86; 340/333

[56] References Cited
UNITED STATES PATENTS

| | | | |
|---|---|---|---|
| 1,729,109 | 9/1929 | Haskins................................ | 317/99 |
| 1,922,079 | 8/1933 | Dixon.................................. | 315/86 |
| 2,457,023 | 12/1948 | Zelt................................... | 174/DIG. 2 |
| 2,473,034 | 6/1949 | Shaheen............................ | 174/DIG. 2 |
| 2,572,617 | 10/1951 | Haury et al......................... | 317/99 |
| 3,040,170 | 6/1962 | Chwan................................ | 174/DIG. 2 |
| 3,243,659 | 3/1966 | Bostonian........................... | 317/99 |
| 3,688,123 | 8/1972 | Walker................................ | 315/86 |

*Primary Examiner*—J. V. Truhe
*Assistant Examiner*—David A. Tone

[57] ABSTRACT

Apparatus for mounting an A.C. ballast and a D.C. emergency lighting system. A first elongated mounting member having first and second portions and a plurality of mounting holes is provided. The first portion is adapted to receive a first enclosure housing an A.C. ballast and an emergency lighting invertor. The second portion is adapted to receive a second elongated mounting member which supports a second enclosure housing a battery for providing emergency power. The second elongated mounting member may also be mounted in a spaced relation to the first elongated mounting member. A plurality of perforations are provided between the first portion and the second portion of the first member for severing the two portions from one another if there are space limitations. There is a raised portion having a slot associated therewith located on the first portion of the first elongated mounting member near the perforations for receiving a tab which extends from one end of the second elongated mounting member. At the other end of the second elongated mounting member there is a mounting hole and a rectangular space. The second portion of the first elongated mounting member also has a mounting hole and a rectangular space at one end. The combination of the rectangular space, holes and raised portion and tab help insure that the second housing containing the battery will be mounted only after the first elongated mounting member is mounted. The second housing containing the battery includes a pair of tabs which are shaped so that they will be wedged into the slot of the raised portion so that the first enclosure and the second enclosure are mounted a small distance from one another for thermal insulation. A thermal protective device is also connected to the ballast to guard against battery overheating during normal operations.

10 Claims, 6 Drawing Figures

RETROFIT EMERGENCY LIGHTING PACKAGE

BACKGROUND OF THE INVENTION

This invention relates to a means for mounting a normal and emergency lighting apparatus to a lamp fixture. More particularly, it relates to retrofitting a gaseous discharge lighting system for operating on emergency power.

There have been various attempts to provide emergency lighting for rooms during the failure of normal line power. One of these emergency lighting systems includes battery operated sealed beam lights, similar to automobile headlights, mounted in certain strategic areas of the room. This system has several disadvantages, one of which is that the glare which is associated with incandescent sealed beam light causes harsh shadows and may cause confusion during an emergency condition. Furthermore these sealed beam lamps are in addition to the normal operating lamps adding to the cost. A suitable place for mounting these sealed beam lamps must also be found in the room.

There are also systems which retrofit fluorescent lighting systems already available in the room and the problem of glare and the necessity of adding new lamps is eliminated. The retrofitting techniques in the past have employed a single enclosure housing the normal ballast, the emergency lighting invertor and the battery to power the invertor. However this technique lacked flexibility for mounting in fixtures of various lengths because everything was in a single package. Also, since the battery was enclosed in the same case as the normal ballast, it often overheated. Furthermore, the invertor was often connected to the battery before the mounting took place resulting in an electrical shock hazard during mounting. It is therefore desirable to provide a retrofit emergency lighting system overcoming these problems.

OBJECTS OF THE INVENTION

One of the objects of the invention is to provide an improved retrofit emergency lighting system for operating available gaseous discharge lamps.

Another object is to provide a means for mounting emergency and normal circuitry and a battery for operating the emergency circuitry wherein the battery is thermally insulated from the emergency and normal circuitry.

Another object is to provide a means for mounting an emergency lighting system wherein the battery may be mounted spaced apart from the invertor and the ballast.

Another object is to provide a retrofit emergency lighting package wherein the length may be varied for space limitations.

Another object is to provide emergency lighting system adapted to protect the battery from overheating.

SUMMARY OF THE INVENTION

In accordance with one form of this invention there is provided an apparatus for a mounting emergency lighting system for starting and operating at least one gaseous discharge lamp. A first elongated mounting member is adapted to be mounted on a lighting fixture. A first enclosure housing at least an emergency lighting driving device is mounted on the first portion of the first elongated mounting member. A second enclosure housing at least a battery is mounted on a second elongated mounting member. The second elongated mounting member may be selectively mounted on a second portion of the first elongated mounting member or the second elongated mounting member may be mounted spaced apart from the first elongated mounting member.

BRIEF DESCRIPTION OF THE DRAWINGS

The subject matter which is regarded as the invention is set forth in the appended claims. The invention itself, however, together with further objects and advantages thereof may be better understood by reference to the following description taken in conjunction with the accompanying drawings in which:

DESCRIPTION OF THE PREFERRED EMBODIMENT

Figure 1:
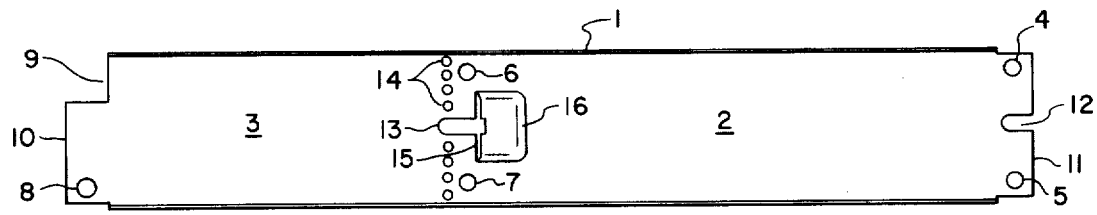
FIG. 1 is a plan view of the first elongated mounting member.

Referring now particularly to FIG. 1, the first elongated mounting member 1 is divided into a first portion 2 and a second portion 3 adapted to support first and second enclosures respectively. A plurality of linearly related holes 14 divide the first portion from the second portion. The plurality of mounting holes including 4, 5, 6, 7 and 8 are provided in the first elongated mounting member for mounting the first member onto a lighting fixture. Rectangular space 9 is cut out of the second portion 3 opposite to mounting hole 8 at end 10. At the opposite end 11 of the first member 1 there is further provided a recess 12 adapted to receive a mounting screw for further mounting the first member to the lighting fixture. Another recess 13 is provided between the linearly related holes 14 and is adapted to receive a mounting screw for mounting the first member to a fixture in certain instances. Holes 4-8 are the type which have been punched through and have jagged extensions for mounting housings thereto. There is further provided a raised portion 16 located near recess 13 having slot 15 associated therewith.

Figure 2:
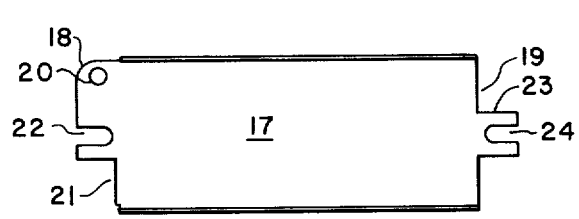
FIG. 2 is a plan view of the second elongated mounting member.

Referring now to FIG. 2, there is provided a second elongated mounting member 17 having ends 18 and 19. End 18 has a mounting hole 20 and rectangular cut out portion 21 adapted to respectively fit over cut out portion 9 and mounting hole 8 of FIG. 1. There is further provided a recess 22 located between hole 20 and cut out 21 adapted to receive a mounting screw. The opposite end 19 of second member 17 includes tab 23 having recess 24. Recesses 22 and 24 are adapted to receive mounting screws when the second elongated mounting member 17 is to be mounted spaced apart from the first elongated mounting member. Space limitations may require that the two members be mounted apart.

Figure 4:
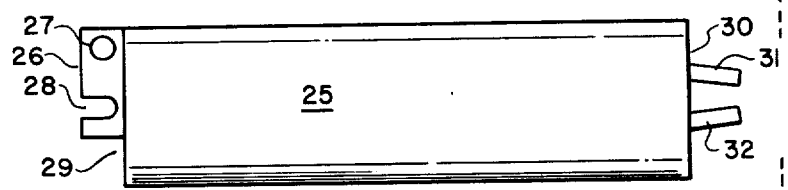
FIG. 4 is a top view of the second enclosure which houses the battery.

Referring now to FIG. 4, there is provided second enclosure 25 for housing a battery and adapted to be mounted on second mounting member 17. The bottom side (not shown) of the second enclosure may be open or closed. End 26 of the second enclosure includes mounting hole 27, mounting recess 28 and rectangular cut out portion 29 adapted to fit over mounting hole 20 of the second elongated mounting member 17 of FIG. 2. End 30 of enclosure 25 has a pair of tabs 31 and 32 protruding therefrom. These tabs are not at right angles to end 30 but their combination presents a tapering away from end 30. Tabs 31 and 32 are to be fitted into slot 15 associated with raised portion 16 on first elongated member 1 when the second housing 25 and the second elongated mounting member 17 are mounted on the first elongated mounting member 1.

Figure 5:
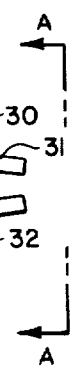
FIG. 5 is an end view of the second enclosure taken along lines AA of FIG. 4.

FIG. 5 shows a side view of first housing 25 along line AA of FIG. 4. Tabs 31 and 32 extend slightly below the bottom 33 of second enclosure 25. Raised portion 36 above tabs 31 and 32 is adapted to receive tab 23 of the second elongated mounting member 17 shown in FIG. 2 so that the second enclosure is mounted on the second elongated member 17. The sides 34 and 35 are slightly tapered inward so that the second housing will fit in a normal channel.

Figure 6:
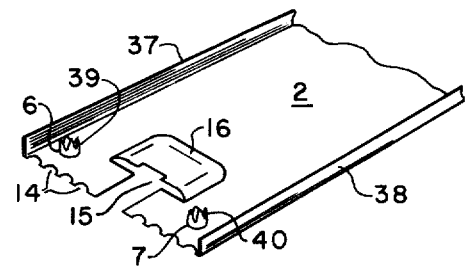
FIG. 6 is a fragmentary perspective view of the first portion of the first elongated mounting member wherein the second portion has been severed.
Figure 3:
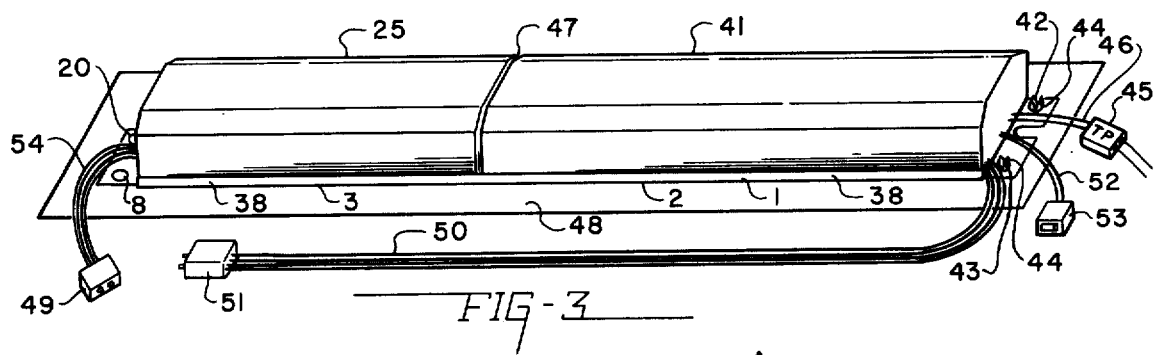
FIG. 3 is a perspective view of the first and second enclosures mounted on the first and second elongated mounting members.

FIG. 6 shows a part of the first portion 2 of the first elongated mounting member 1 wherein the first and second portions are severed along perforation 14. Rails 37 and 38 are shown along each side of the first member to aid in the mounting of the first enclosure. Holes 6 and 7 have raised metal portions 39 and 40 respectively associated therewith to provide a clamp for mounting a first enclosure thereto. Referring now to FIG. 3, there is shown the first elongated mounting member 1 having first enclosure 41 mounted on the first portion 2 and second enclosure 25 ultimately mounted on second portion 3. First enclosure 41 which houses an A.C. ballast (not shown) and an emergency lighting driving device (not shown), has a pair of holes 42 and 43 at one end and another pair (not shown) at the other end for mounting over holes 4, 5, 6 and 7 respectively. These holes 4, 5, 6 and 7 respectively are situated next to raised portions 44 which may be bent over the sides of the holes 42 and 43 in order to secure the first enclosure to the first member.

Second enclosure 25, which houses a battery, is mounted on member 17. The second enclosure is also mounted by raised portions around holes 20 and 8. The raised portions are bent over the sides of the hole 27 of the second enclosure for mounting. However, the perforated side of the second portion of the first member does not have mounting holes. Rather tab 23 and tapering tabs 31 and 32, shown in FIG. 4, are slid into slot 15 of raised portion 16 on the first member. This type of arrangement is useful in that the installer must install the first member before he installs the second member. The installer should not be able to connect the battery to the invertor (via terminals 49 and 51) while installing the first member. This helps avoid the hazard of electrical shock to the installer. The tapering of the combination of tabs 31 and 32 on the second housing help prevent the first and second enclosures from coming into thermal contact with one another. This tapering causes spacing 47, shown in FIG. 3, such that it is far enough away so that little thermal conduction occurs, but is near enough so that little convection currents occur. Most of any thermal conduction at the bottom of the enclosure is sunk through first member 1 to fixture 48. This helps to keep the battery from overheating. Another device which aids in keeping the battery from overheating is thermal protector 45 which is connected to lead 46. Lead 46 is connected through the first enclosure 41 to the ballast which is housed in the first enclosure. If the heat around the thermal protector gets too high it will open the circuit and turn off the lamps and allow the battery to cool down.

The second enclosure mounted on the second elongated mounting means 17 could be mounted more substantially spaced apart from the first enclosure 41. This could be done because of a space limitation in the fixture 48. If this is necessary second portion 3 of the first elongated mounting member 1 could be severed from the first portion by first weakening the rails with an appropriate wire cutter, or other device, near the linearly related perforations 14 and then bending the first member at these perforations until it breaks.

Wires 54 protruding from second enclosure 25 are connected to the battery (not shown). Terminal 49 is connected to the other ends of wires 54. Wires 50 are protruding from the first housing 41 and are ultimately connected to the invertor inside the housing (not shown). Terminal 51 is connected to the other end of the wires 50. Connectors 51 and 49 are adapted to be connected together after the second enclosure has been mounted to the second portion of the first member or after the second enclosure has been mounted spaced apart from the first member. Wires 52 again protrude from the first housing and are connected to the invertor. The other end of the leads 52 is connected to test switch 53 which has a means to indicate whether there is sufficient battery power present to operate the invertor and then ultimately to operate the gaseous discharge lamps. Test switch 53 is of a type well known in the art.

From the foregoing description of the illustrative embodiment of the invention, it will be apparent that many modifications may be made therein. For example, various types and means may be used to maintain space between the first and second housing so that there is sufficient thermal insulation. It will be understood that this embodiment of the invention is intended as an exemplification of the invention only and that this invention is not limited thereto. It is also understood therefore that it is intended in the appended claims to cover all modifications that fall within the true spirit and scope of this invention.

I claim:

1. Apparatus for mounting an emergency lighting system for starting and operating at least one gaseous discharge lamp comprising:

a first elongated mounting member adapted to be mounted to a lighting fixture;

a first enclosure to house at least an emergency lighting driving device, said first enclosure being mounted on a first portion of said first elongated mounting member;

a second enclosure to house at least a battery for providing emergency power;

a second elongated mounting member;

means mounting said second enclosure on said second elongated mounting member;

means selectively mounting said second elongated mounting member on a second portion of said first elongated mounting member;

means maintaining said first enclosure a predetermined distance from said second enclosure for providing thermal insulation, said means maintaining including a pair of tabs connected to one end of said second enclosure, a raised portion on one end of said first portion and a slot associated with said raised portion receiving said pair of tabs.

2. Apparatus as set forth in claim 1 wherein said first enclosure is adapted to house a ballast for operating the at least one gaseous discharge lamp during normal conditions and an invertor for operating the lamp during emergency conditions.

3. Apparatus as set forth in claim 1 further including means mounting said second elongated mounting member substantially spaced apart from said first elongated mounting member.

4. Apparatus as set forth in claim 1 further including means mounting said second member to said second portion only after said first member is mounted.

5. Apparatus as set forth in claim 1 wherein said means selectively mounting said second elongated mounting member on said second portion of said first elongated mounting member includes a raised portion situated on said first elongated mounting member near the junction of said first and second portions, a slot associated with said raised portion, and a tab connected to one of the short ends of said second elongated mounting member; said tab being received in said slot when said second member is mounted on said first member.

6. Apparatus as set forth in claim 5 further including a mounting first hole and a first cut out area on the opposite end to said tab on said second member, and second hole and second cut out portion on one end of said second portion of said first member whereby said first hole is mounted over said second cut out portion and said first cut out portion is mounted over said second hole.

7. Apparatus as set forth in claim 5 wherein said tab includes a recess extending partially into said tab for receiving a first screw and a second recess extending longitudinally into another of said short sides of said second elongated mounting member, said second recess for receiving a second screw for mounting said second elongated mounting member substantially spaced apart from said first elongated mounting member.

8. Apparatus as set forth in claim 1 further including a weakened section between said first portion and said second portion to facilitate severance of said first portion and said second portion.

9. Apparatus as set forth in claim 1 wherein said first elongated mounting member includes a plurality of linearly related perforations positioned between said first portion and said second portion for aiding in the severance of said first portion from said second portion.

10. Apparatus for mounting a ballast and emergency lighting system for starting and operating at least one gaseous discharge lamp comprising:

a first elongated mounting member having parallel rails along the long sides and a plurality of holes for mounting said first elongated mounting member to a lighting fixture;

a first enclosure housing a ballast for operating the at least one gaseous discharge lamp during normal conditions and further for housing an invertor for operating the lamp during emergency conditions;

means mounting said first enclosure on a first portion of said first elongated mounting member between said parallel rails;

a second enclosure housing a battery for providing emergency power, said second enclosure having a pair of tabs connected to one end, together with tabs presenting a tapering away in width from said one end;

a second elongated mounting member;

means mounting said second enclosure on said second member;

means selectively mounting said second mounting member on a second portion of said first elongated mounting member;

a raised portion and a slot associated therewith on said first portion for receiving said pair of tabs; said slot and said tabs being adapted to maintain said first and second enclosures a predetermined distance apart for thermal insulation;

a plurality of perforations at the boundary between said first and second portions of said first elongated mounting member to facilitate selective severance of said first and second portions wherein said second enclosure may be mounted substantially spaced apart from said first enclosure.

* * * * *